United States Patent [19]

Ohmura

[11] Patent Number: 5,177,892
[45] Date of Patent: Jan. 12, 1993

[54] LINE GUIDE DEVICE FOR FISHING RODS AND METHOD FOR MAKING THE SAME

[75] Inventor: Ryuichi Ohmura, Shizuoka, Japan
[73] Assignee: Fuji Kogyo Co., Ltd., Shizuoka, Japan
[21] Appl. No.: 737,504
[22] Filed: Jul. 30, 1991
[30] Foreign Application Priority Data Aug. 1, 1990 [JP] Japan .................................. 2-204514

[51] Int. Cl.$^5$ .............................................. A01K 87/04
[52] U.S. Cl. ....................................................... 43/24
[58] Field of Search ............................................. 43/24
[56] References Cited

U.S. PATENT DOCUMENTS

| | | | |
|---|---|---|---|
| 4,141,132 | 2/1979 | Ohmura | 43/24 |
| 4,174,583 | 11/1979 | Ohmura | 43/24 |
| 4,196,537 | 4/1980 | Ohmura | 43/24 |
| 4,445,293 | 5/1984 | Ohmura | 43/24 |
| 4,682,439 | 7/1987 | Inoue et al. | 43/24 |
| 4,697,375 | 10/1987 | Mills | 43/24 |
| 4,893,429 | 1/1990 | Yamoto | 43/24 |

FOREIGN PATENT DOCUMENTS

| | | |
|---|---|---|
| 48-35747 | 10/1973 | Japan . |
| 54-7189 | 1/1979 | Japan . |
| 1-116058 | 8/1989 | Japan . |
| 851755 | 10/1960 | United Kingdom ..................... 43/24 |

*Primary Examiner*—Kurt C. Rowan
*Attorney, Agent, or Firm*—Wegner, Cantor, Mueller & Player

[57] ABSTRACT

A line guide device for fishing rods includes an annular holder for holding a line guide ring, which is defined by a metallic annulus and provided with a peripheral groove and an outer ring defined by a metallic annulus. The annular holder receives in the rectangular groove an inner surface portion of the outer ring, and is tightly joined at the plastically deformable region to the inner surface portion of the outer ring. Also, a simplified method for making such a line guide device is provided.

2 Claims, 2 Drawing Sheets

LINE GUIDE DEVICE FOR FISHING RODS AND METHOD FOR MAKING THE SAME

BACKGROUND OF THE INVENTION

1. Field of the Invention

The present invention is directed to an improvement in or relating to a line guide device for fishing rods, which is a fixing device with a line guide ring formed as of ceramics or a hard stone and a method for making such a line guide device.

2. Prior Art

So far, line guide devices for fishing rods have been manufactured by interposing an annular holder made of an elastic material between a line guide ring formed of ceramics or a hard stone and an outer ring made of a metallic material, as set forth in Japanese Utility Model Publication No. 48(1973)-35747, or inserting a clamp ring composed of a synthetic resin having T shape cross section between an outer or enclosure ring and a ceramic line guide ring from both sides, as disclosed in Japanese Utility Model Laid-Open Publication No. 54(1979)-7189, or fitting a split or outer ring made of a metallic material into a peripheral groove in the outer surface of a metallic annular holder into which a line guide ring has been fixed by caulking, as described in Japanese Utility Model Laid-Open Publication No. 1(1989)-116058.

However, a problem with the insertion of an annular holder or clamp ring composed of an elastic or synthetic resin material, such material is likely to become disengaged when receiving a large external force.

In the case of the device made by fitting a split or outer ring made of a metallic material into a peripheral groove of a metallic annular holder into which a line guide ring has been fixed by caulking and then contracting the outer ring to fix the metallic holder in place, since the outer ring is of the split type it is necessary to increase the depth of the peripheral groove so as to prevent disengagement of the metallic annular holder. This in turn requires the metallic annular holder to be large and poses problems in connection with its size and weight.

In view of the foregoing, this invention seeks to provide a line guide device for fishing rods in which a metallic annular holder for holding a line guide ring is fixed to an outer ring defined by a metallic annulus with high strength, of a small size and light in weight, and to provide a relatively simple method for manufacturing such device.

SUMMARY OF THE INVENTION

According to one aspect of this invention, there is thus provided a line guide device for fishing rods, including an annular holder for holding a line guide ring, which is defined by a metallic annulus and provided with a peripheral groove along the entire circumference thereof and an outer ring defined by a metallic annulus, said annular holder receiving in said peripheral groove an inner surface portion of said outer ring and being tightly joined at the plastically deformable region to said inner surface portion of said outer ring.

According to another aspect of this invention, there is provided a method for manufacturing a line guide device for fishing rods, comprising the steps of:

forming an outer ring of a metallic material such that the inner surface is defined by an annulus, forming an annular holder for holding a line guide ring of a metal with an outer diameter almost equal to the inner diameter of said outer ring and in the form of an annulus having a peripheral groove, said groove receiving an inner surface portion of said outer ring, and bringing said annular holder disposed with said inner surface portion of said outer ring and increasing the diameter of said annular holder by radial and outward plastic deformation, thereby joining said peripheral groove to said inner surface portion of said outer ring.

The inner surface portion of the annular holder is merely increased in diameter with the use of a punch of a pressing machine. It is possible to make a tight joint between the outer ring and the annular holder at the plastically deformable region defined by metal, thus enabling assembling to be more simplified and a much more increased joint strength to be obtained through a simplified joint structure.

BRIEF DESCRIPTION OF THE DRAWINGS

This invention will now be explained more specifically but not exclusively with reference to the accompanying drawings, in which.

DETAILED DESCRIPTION OF THE PREFERRED EMBODIMENTS

Figure 1:
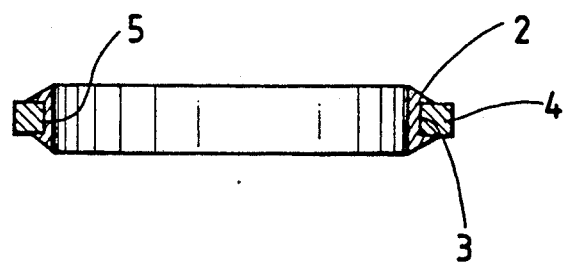
FIG. 1 is a longitudinally sectioned sketch showing part of one embodiment of this invention.
Figure 2:
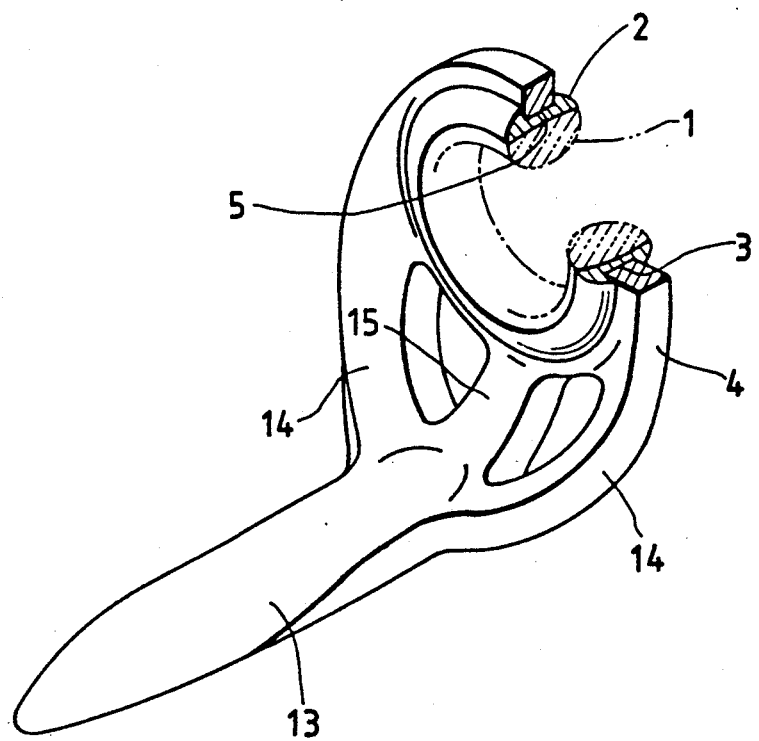
FIG. 2 is a partly sectioned, perspective view of the line guide device for fishing rods according to this invention.

Referring now to FIGS. 1 and 2, there is shown an embodiment of the line guide device for fishing rods according to this invention. A metal annular holder 2 for holding a line guide ring 1 is formed into an endless annular shape, and provided with a peripheral groove. The line guide is formed on ceramics or a hard stone.

An outer ring 4, on the other hand, is similarly made of a metallic material such that its inner surface portion 5 is formed into an endless annular shape.

The annular holder 2 receives the inner surface portion 5 of the outer ring 4 in its rectangular groove 3, and is tightly joined at its plastically deformable region of the metallic material to the inner surface portion 5 of the outer ring 4.

The above-mentioned line guide device for fishing rods is made by the following steps.

Figure 3:
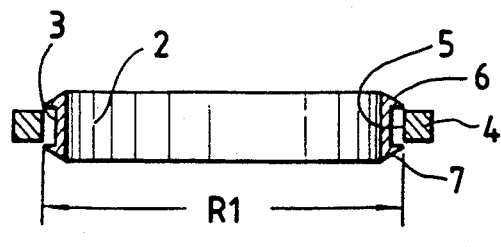
FIG. 3 is a longitudinally sectioned sketch showing the structural relation between the outer ring just before increased in diameter and the annular holder

As illustrated in FIG. 3, the outer ring 4 is made of a metallic material such that its inner surface portion 5 is formed into an endless annular shape. Similarly, the annular ring 2 is formed of a metallic material. However, this annular ring 2 is designed to have an outer diameter $R_1$ that is equal at most to the inner diameter of the inner surface portion 5 of the outer ring 4. In addition, it is provided with the peripheral groove 3 along the entire circumference thereof, which is of enough size to receive the inner surface 5 of the outer ring 4.

Then, the annular holder 2 is located in touch with the inner surface 5 of the outer ring portion 4, as shown in FIG. 3. Using a punch of a pressing machine—which is mentioned by way of example alone, radially and outwardly exerting pressure is applied to the entire periphery of the annular holder 2 to increase its diameter through plastic deformation, thereby joining the peripheral groove 3 tightly to the inner surface portion 5 of the outer ring 4.

Figure 4:
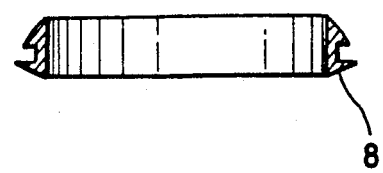
FIG. 4 is a longitudinally sectioned sketch showing another embodiment of the annular holder.

Preferably but not exclusively, the flanges 6 and 7 provided on both sides of the peripheral groove 3 in the annular holder 2 may be tapered to receive the inner surface portion 5 of the outer ring 4 smoothly and to caulk the line guide ring 1, as will be described later. In order to position the annular holder 2 on the inner surface surface 5 of the outer ring 4, one—shown at 8 in FIG. 4—of the flanges may be slightly larger in its outer diameter than the inner diameter of the inner surface portion 5 of the outer ring 4; the annular holder 2 can be positioned in place by allowing the flange 5 to engage the outer ring 4.

Figure 5:
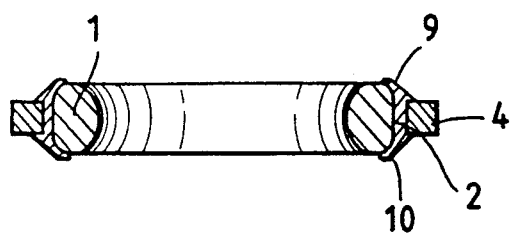
FIGS. 5 and 6 are longitudinally sectioned sketches illustrating the joint structures of different annular holders to different line guide rings.
Figure 6:
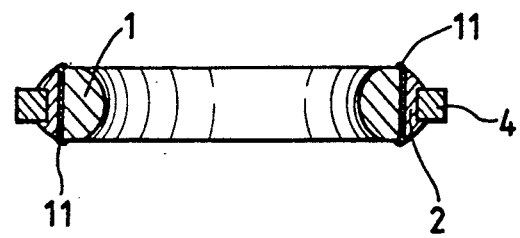

After the outer ring 4 has been joined to the annular holder 2 as mentioned above, the line guide ring 1 formed of, e.g. ceramics or a hard stone is fitted in the annular holder 2. Fitting of the annular holder 2 onto the line guide ring 1 may be achieved either by caulking both end edges of the flanges 6 and 7 of the annular holder 2, as shown in FIG. 5, or with an adhesive layer 11, as illustrated in FIG. 6.

Figure 7:
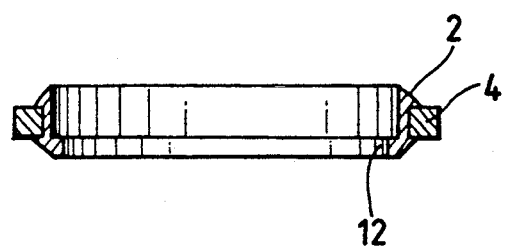
FIG. 7 is a longitudinally sectioned sketch of a further embodiment of the annular holder.

As illustrated in FIG. 7, an inward flange 12 may be formed on the inner peripheral edge of the annular ring 2 so as to position the line guide ring 1 in place within the annular holder.

What is claimed is:

1. A line guide device for fishing rods comprising a unitary annular line guide ring holder, an outer ring, and a line guide ring, said annular holder comprising a metallic annulus having an annular rectangular groove on the outer periphery thereof, said outer ring being defined by a metallic annulus, said annular holder receiving an inner surface portion of said outer ring in said rectangular groove and being tightly joined to said inner surface portion of said outer ring by plastic deformation of said annular holder prior to insertion of said line guide ring into said annular holder.

2. A method for manufacturing a line guide device for fishing rods comprising the steps of:

forming a unitary outer ring of a metallic material such that the inner surface is defined by an annulus, forming an annular line guide ring holder of a metal with an outer diameter equal at most to the inner diameter of said outer ring and in the form of an annulus having an annular rectangular groove on the outer periphery thereof, said groove being capable of receiving an inner surface portion of said outer ring, bringing said annular holder in touch with the rest of said inner surface of said outer ring, increasing the diameter of said annular holder by radial and outward plastic deformation thereby joining said peripheral groove to said inner surface portion of said outer ring, and thereafter mounting a line guide ring within said annular holder.

* * * * *